(12) United States Patent
Deuel

(10) Patent No.: US 9,966,895 B1
(45) Date of Patent: May 8, 2018

(54) TROLLING MOTOR AND METHOD FOR CONTROLLING A TROLLING MOTOR

(71) Applicant: Brunswick Corporation, Lake Forest, IL (US)

(72) Inventor: Eric S. Deuel, Allendale, MI (US)

(73) Assignee: Brunswick Corporation, Mettawa, IL (US)

( * ) Notice: Subject to any disclaimer, the term of this patent is extended or adjusted under 35 U.S.C. 154(b) by 0 days. days.

(21) Appl. No.: 15/622,441

(22) Filed: Jun. 14, 2017

(51) Int. Cl.
*H02P 29/50* (2016.01)
*H02P 11/04* (2006.01)
*H02P 7/29* (2016.01)

(52) U.S. Cl.
CPC ............... *H02P 29/50* (2016.02); *H02P 7/29* (2013.01); *H02P 11/04* (2013.01); *H02P 2201/11* (2013.01)

(58) Field of Classification Search
CPC ........ H02P 2201/11; H02P 11/04; H02P 7/29; H02P 29/50
USPC ......................................................... 318/139
See application file for complete search history.

(56) References Cited

U.S. PATENT DOCUMENTS

| | | | | |
|---|---|---|---|---|
| 4,093,901 A | * | 6/1978 | Rose ..................... | H02P 7/291 318/476 |
| 4,114,074 A | * | 9/1978 | Stewart ................ | B63H 25/24 318/257 |
| 4,122,448 A | * | 10/1978 | Martin .................. | G01S 7/288 330/52 |
| 4,995,010 A | * | 2/1991 | Knight ................. | B63H 20/007 367/111 |
| 5,069,642 A | * | 12/1991 | Henderson ........... | B63H 20/007 114/144 E |
| 5,108,322 A | * | 4/1992 | Henderson ............. | B63H 25/24 440/7 |

(Continued)

OTHER PUBLICATIONS

Handley, P.G., "Spread Spectrum Switching: A Low Noise Modulation Technique for PWM Inverter Drives", Thesis submitted to University of Auckland, New Zealand, pp. 101-125, available at least as early as Jul. 16, 1991, available for download at https://researchspace.auckland.ac.nz/handle/2292/2230.

(Continued)

*Primary Examiner* — Rita Leykin
(74) *Attorney, Agent, or Firm* — Andrus Intellectual Property Law, LLP

(57) ABSTRACT

A method for controlling a trolling motor including a sonar transducer and an electric motor rotating a propeller includes providing a motor controller configured for electrical connection to the electric motor. The motor controller includes a pulse width modulator outputting a PWM signal. A high-side electronic switch is provided between a high-side output of the pulse width modulator and the electric motor and a low-side electronic switch is provided between a low-side output of the pulse width modulator and the electric motor. The electric motor is driven by current transmitted via the high-side electronic switch or the low-side electronic switch in response to the PWM signal. An operating frequency of the PWM signal is selected such that an operating frequency of the sonar transducer is approximately centered between harmonic frequencies of the PWM signal. A spread spectrum switching algorithm reduces a peak noise level of the PWM signal.

20 Claims, 5 Drawing Sheets

(56) References Cited

U.S. PATENT DOCUMENTS

| | | | | |
|---|---|---|---|---|
| 5,112,258 | A * | 5/1992 | Folsom | B63H 20/007 440/6 |
| 5,171,173 | A * | 12/1992 | Henderson | B63H 20/007 114/153 |
| 5,375,101 | A * | 12/1994 | Wolfe | B06B 1/045 181/110 |
| 5,453,672 | A * | 9/1995 | Avitan | B60L 11/1805 318/493 |
| 5,486,833 | A * | 1/1996 | Barrett | G01S 7/414 342/204 |
| 5,525,081 | A * | 6/1996 | Mardesich | B63H 20/007 114/144 E |
| 5,884,213 | A * | 3/1999 | Carlson | B63H 25/42 114/144 A |
| 6,433,507 | B1 * | 8/2002 | Makaran | H02P 7/29 318/599 |
| 6,507,164 | B1 * | 1/2003 | Healey | B63H 20/007 318/588 |
| 6,652,331 | B2 | 11/2003 | Healey | |
| 6,659,815 | B2 * | 12/2003 | Motsenbocker | B63H 1/28 440/1 |
| 6,902,446 | B1 * | 6/2005 | Healey | H02K 23/66 114/144 E |
| 7,306,496 | B1 * | 12/2007 | Carmen | B63H 20/007 440/1 |
| 8,144,546 | B2 * | 3/2012 | Lovik | G01S 7/539 367/139 |
| 2003/0203684 | A1 * | 10/2003 | Healey | B63H 20/007 440/6 |
| 2004/0090195 | A1 * | 5/2004 | Motsenbocker | B63B 43/18 318/109 |

OTHER PUBLICATIONS

Jeelabs, "Ringing MOSFETs", web article, published Dec. 5, 2012, last accessed May 8, 2017, available at http://ieelabs.org/2012/12/05/ringingmosfets/.

Lira Electronica, "Spectral Analysis of PWM Signal", web article, published Oct. 31, 2007, last accessed Jun. 2017, available at http://liraeletronica.weebly.com/uploads/4/9/3/5/4935509/spectral_analysis_of_a_pwm_signal.pdf.

Maxim Integrated, "An Introduction to Spread-Spectrum Communications", web tutorial, published Feb. 18, 2003, last accessed Jun. 7, 2017, available at https://www.maximintegrated.com/en/appnotes/index.mvp/id/1890.

Sipex, "Properly Sizing MOSFETs for PWM Controllers", application note, published Nov. 16, 2006, last accessed Jun. 2017, available at https://www.exar.com/content/document.ashx?id=1245.

Texas Instruments, "Ringing Reduction Techniques for NexFETTM High Performance MOSFETs", application report, Nov. 2011, last accessed Jun. 2017, available at http://www.ti.com/lit/an/slpa010/slpa010.pdf.

The West Advisor, "Fishtinder Technology Explained", web article, last updated Dec. 5, 2016, last accessed May 10, 2017, available at https://www.westmarine.com/WestAdvisor/SelectingaFishfinder.

* cited by examiner

TROLLING MOTOR AND METHOD FOR CONTROLLING A TROLLING MOTOR

FIELD

The present disclosure relates to trolling motors for use with boats and methods for controlling trolling motors.

BACKGROUND

U.S. Pat. No. 5,171,173 discloses a servo controlled trolling motor steering system that provides improved speed and steering control. The system includes apparatus for mounting the motor on a boat for rotation about an axis to effect steering of the boat. A foot pedal includes a base and a foot pad pivotally mounted to the base, the foot pad being pivotal by a user to command a desired steering direction. A membrane potentiometer senses rotational position of the motor to develop an electrical signal representative of the rotational position, the signal comprising a steering feedback signal. A second membrane potentiometer senses pivotal position of the foot pad relative to the base to develop an electrical signal representative of the pivotal position, the signal comprising a steering command signal. A steering control is mounted to the mounting apparatus for steering the trolling motor, including a servo driven gear set for rotating the trolling motor and an electrical control responsive to the steering command signal and the steering feedback signal for actuating the servo to rotate the trolling motor to steer the boat.

U.S. Pat. No. 5,525,081 discloses a trolling motor system and method for controlling the trolling motor, including a microcontroller, a plurality of transducers, a steering motor, and an outboard motor. The user is allowed to input commands via a keypad and the selected mode of operation is displayed via an LCD screen. The microcontroller operates the transducer to transmit sonar signals and the return signals are received and processed accordingly. In the preferred embodiment, there are five transducers arranged in a manner such that the port (left side of the boat) and starboard (right side of the boat) sides as well as the bottom of the boat are scanned continuously. The microcontroller processes the signals according to the user-selected mode, determines the steering degree and the motor speed, transmits these values to the steering motor and position controller and the power drive and motor controller. In the preferred embodiment there are three automatic modes of operation: creek-tracking mode, depth-tracking mode, and shore-tracking mode.

U.S. Pat. No. 6,507,164 discloses a trolling motor having current based power management including: an electric motor; a motor controller having an output for providing voltage to the motor; and a current sensor for measuring the electrical current flowing through the motor. Upon determining that the trolling motor has been operating above its continuous duty limit for a predetermined period of time, the motor controller begins reducing the voltage output to the motor until reaching an acceptable output voltage. In another embodiment, the controller is operated in three distinct modes with three distinct sets of operating parameter, namely: a normal mode wherein the output is set to a commanded level; a current limit mode wherein the output is set to a safe, predetermined level; and a transitional mode wherein the output is incrementally changed from the predetermined level to the commanded level.

U.S. Pat. No. 6,652,331 discloses a trolling motor having an integral sonar transducer including: a submerged motor housing; an electric motor housed in the housing; a sonar transducer housed in the housing; a motor controller having a pulse width modulated output and a shielded electrical cable connecting the sonar transducer to a sonar device. Noise from all sources (i.e., electrical noise from ground loops, radio frequency interference, and magnetic interference) is suppressed in the output signal of the transducer through a number of techniques. The electrical cable includes an outer shield connected to the chassis ground of the trolling motor; an inner shield connected to the circuit ground of the sonar device; and a pair of signal carrying conductors comprising a twisted pair. In addition, the resonant frequency of the transducer is selected such that it is not a harmonic of the operating frequency of the pulse width modulated output of the motor controller.

U.S. Pat. No. 6,902,446 discloses a DC motor having a motor housing and a motor controller housed within the motor housing. In a preferred embodiment the heat producing components of the motor controller are in thermal communication with the housing such that the majority of the heat produced by such components will be readily conducted to the environment in which the motor is operating. When incorporated into a trolling motor, the motor housing of the present invention will be submerged so that controller produced heat will be dissipated into the water in which the trolling motor is operated.

The above-noted patents are hereby incorporated by reference in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method is disclosed for controlling a trolling motor including a sonar transducer and an electric motor configured to rotate a propeller of the trolling motor. The method includes providing a motor controller configured for electrical connection to the electric motor, wherein the motor controller includes a pulse width modulator outputting a pulse width modulated (PWM) signal. The method also includes providing a high-side electronic switch between a high-side output of the pulse width modulator and the electric motor and a low-side electronic switch between a low-side output of the pulse width modulator and the electric motor. The method includes configuring the electric motor to be driven by current transmitted via one of the high-side electronic switch and the low-side electronic switch in response to the PWM signal. The method also includes selecting an operating frequency of the PWM signal such that an operating frequency of the sonar transducer is approximately centered between harmonic frequencies of the PWM signal. The method additionally includes utilizing a spread spectrum switching algorithm to reduce a peak noise level of the PWM signal.

According to another example of the present disclosure a trolling motor includes an electric motor coupled to and configured to rotate a propeller and a motor controller electrically connected to the electric motor. The motor controller including a pulse width modulator generating a pulse width modulated (PWM) signal. A high-side transistor is provided between a high-side gate driver output of the pulse width modulator and the electric motor, and a low-side transistor is provided between a low-side gate driver output of the pulse width modulator and the electric motor. A resistor and a diode are provided in parallel between each of the high-side gate driver output and the high-side transistor and the low-side gate driver output and the low-side transistor, respectively. A user input device is in signal communication with the motor controller and configured to input a trolling motor speed command to the pulse width modulator. The pulse width modulator generates the PWM signal in response to the trolling motor speed command, and the motor controller provides current to the electric motor via one of the high-side transistor and the low-side transistor in response to the PWM signal to control a speed of the electric motor.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
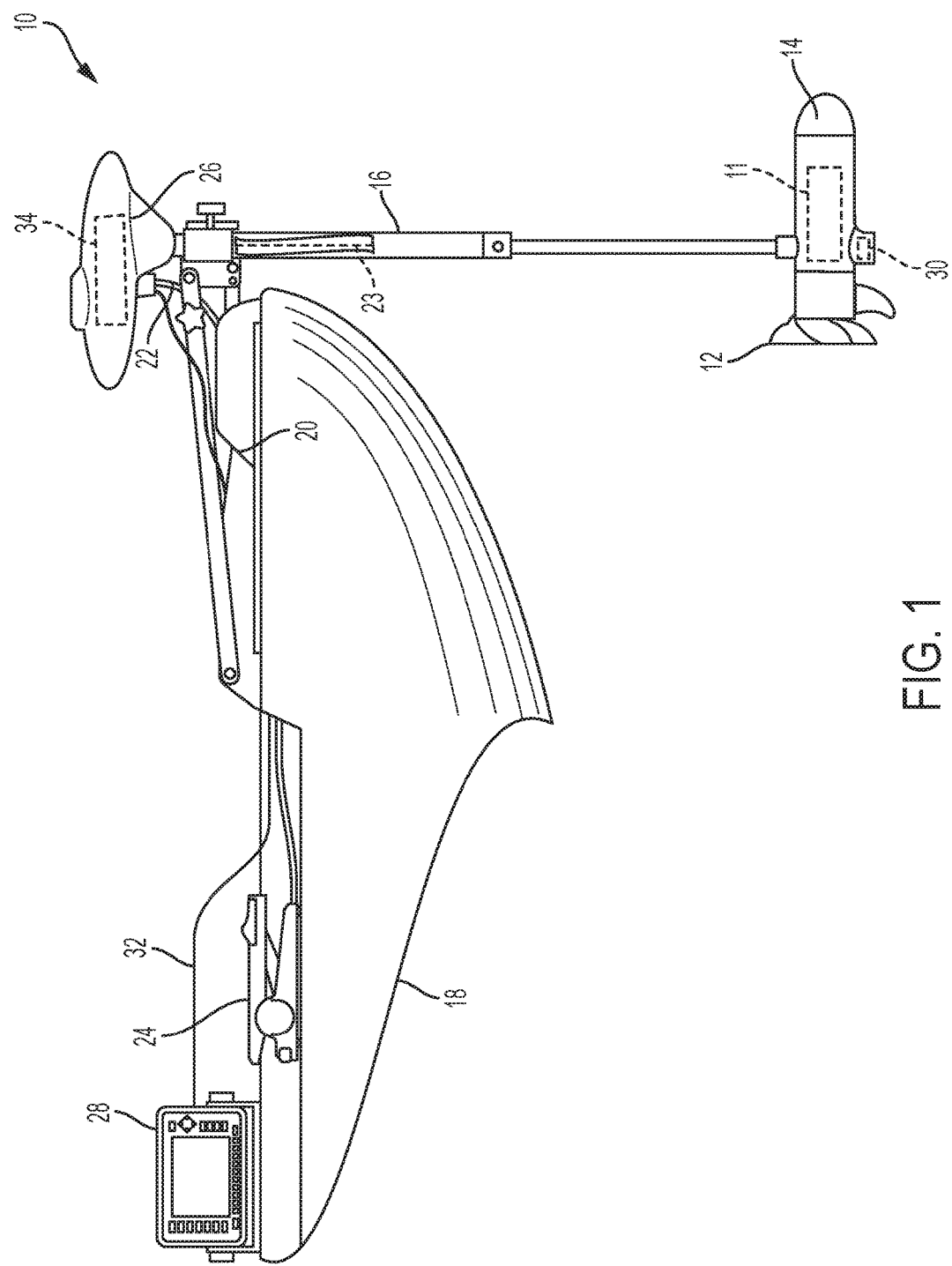
FIG. 1 illustrates a boat including a sonar control unit and a trolling motor having a sonar transducer associated therewith.

FIG. 1 illustrates an example of a trolling motor 10, which is removably attached to a boat 18. The trolling motor 10 includes an electric motor 11 coupled to and configured to rotate a propeller 12, both of which are held by a lower unit 14 of the trolling motor 10. In one example, the electric motor 11 is a brushed DC electric motor that is directly connected to the propeller shaft. A support column 16 supports the lower unit 14 from a mounting bracket 20 connected to the boat 18. A control head 26 is mounted to the upper end of the support column 16, and houses a motor controller 34 (see also FIG. 2). In operation, the speed and steering direction of the trolling motor 10 are controlled by a foot pedal 24 connected to motor controller 34 of the trolling motor 10 by a control cable 22. In other examples, the trolling motor 10 is controlled by way of a hand-held remote control. In yet other examples, the foot pedal 24 and/or remote control wirelessly communicate with the motor controller 34, and the control cable 22 is not provided.

The boat 18 is also equipped with a sonar control unit 28, which can be a fish finder, depth finder, chart plotter, or the like. A sonar transducer 30 is coupled to the lower unit 14 of the trolling motor 10, and can be integrated with the lower unit 14 or clamped or otherwise fastened thereto. In another example, the sonar transducer 30 is coupled to the hull of the boat 18. The sonar transducer 30 is connected to the sonar control unit 28 with a cable 32. In one example, the sonar transducer 30 is a device such as a depth finder that is used to provide the user with navigational options, for example following a straight-ahead course, following a bottom contour, etc. In another example, the sonar transducer 30 is configured to find fish and display their location on the screen of the sonar control unit 28. The sonar control unit 28 causes the sonar transducer 30 to emit a pulse of acoustical ultrasonic energy. Upon completion of the pulse, the sonar control unit 28 uses the transducer to "listen" for return echoes. By measuring the time period to a particular echo, the sonar control unit 28 can determine the distance between the sonar transducer 30 and an object (e.g., lake bottom, school of fish). By measuring the amplitude of the echo, the sonar control unit 28 may predict the size and/or distance of the object. Many contemporary sonar control units employ complex computer software and additional sensors to provide information to the fisherman regarding a host of underwater factors and navigational information.

Figure 2:
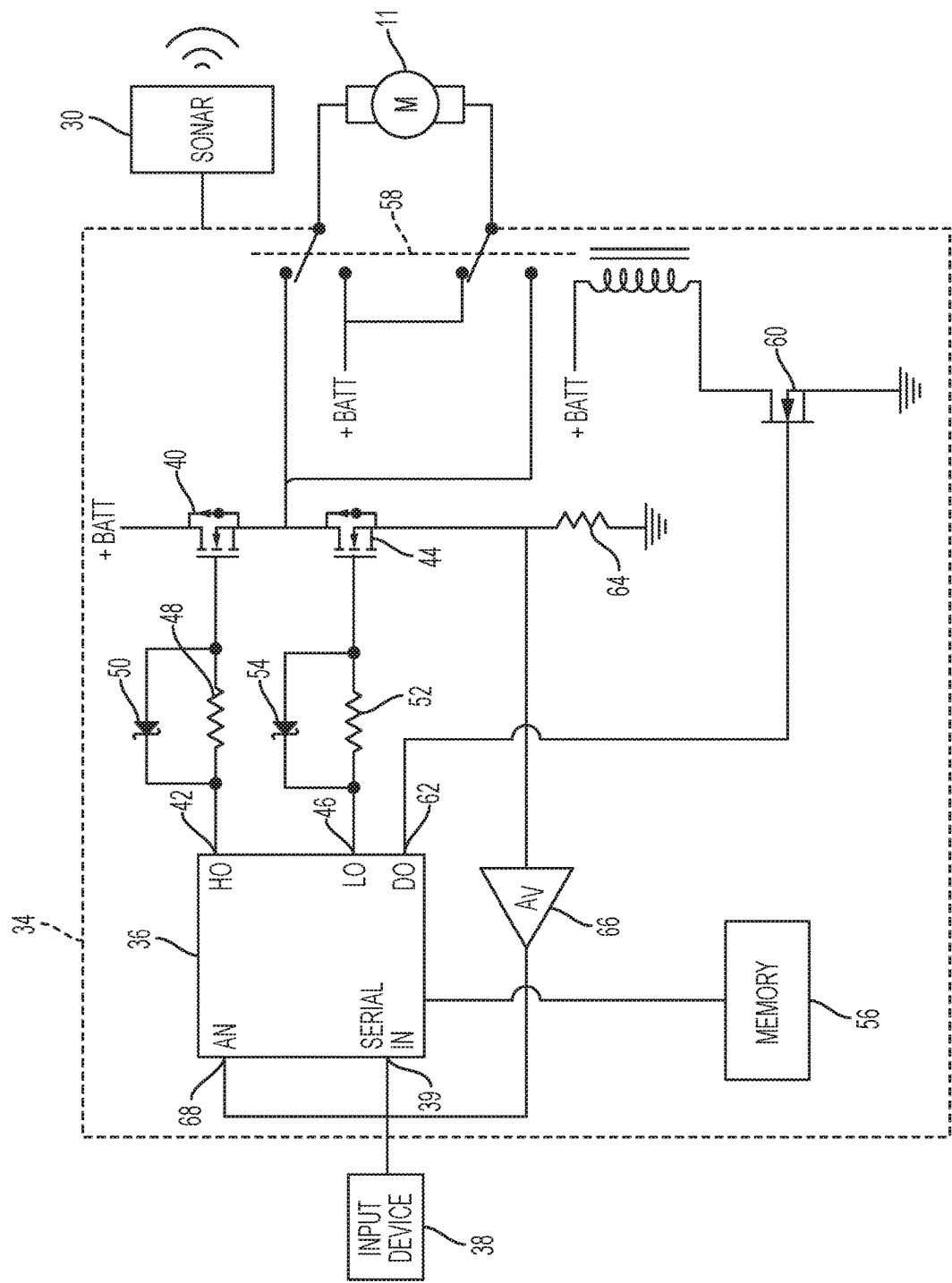
FIG. 2 is a schematic illustrating a motor controller and an electric motor of the trolling motor.

The motor controller 34 is electrically connected to the electric motor 11 by way of a power supply cable 23 extending through the support column 16. The cable 32 also extends through the support column, although such connection is not shown herein. Because cables 23 and 32 pass through support column 16, this reduces their exposure to water. By way of the electrical connection provided by power supply cable 23, the motor controller 34 can control a speed and direction (forward or reverse) of the electric motor 11 and thus a speed and direction of the propeller 12 driveably coupled thereto. The speed and direction of the propeller 12 can be selected by way of a user input device, such as the foot pedal 24 or a remote control, in signal communication with the motor controller 34. Referring briefly to FIG. 2, the motor controller 34 includes a pulse width modulator 36 that generates a pulse width modulated (PWM) signal to control a voltage to (and thus a speed of) the electric motor 11. The user input device, here generically labeled 38, is configured to input a trolling motor speed command to the pulse width modulator 36 via serial input 39. Unfortunately, some attempts to locate a sonar transducer 30 in a trolling motor have been hindered by the amount of electrical and electromagnetic noise present in the general vicinity of the trolling motor 10 due to the operation of the pulse width modulator 36.

Electronic control of trolling motors and electronic steering systems have almost universally employed pulse width modulation (PWM) schemes, as opposed to linear drive circuitry. PWM control systems operate more efficiently than linear drive systems and thus require components that operate at a substantially lower temperature, utilize less power, and need less complex drive circuitry. However, the general nature of a PWM control system requires production of a substantially rectangular waveform at the output of the driver. Such a waveform inherently contains substantial harmonic content many times over the fundamental frequency of the PWM signal. When a PWM signal is used to drive the electric motor 11, the electrical currents are relatively high, thus generating nontrivial amounts of high frequency electrical and electromagnetic noise. If this signal has harmonic content approximately equal to the frequency of the signal produced by the sonar transducer 30, the transducer signal received at the sonar control unit 28 may be completely obscured by the noise thus produced. Further, if the cable 32 connected to the sonar transducer 30 and the power supply cable 23 for the electric motor 11 both run through the support column 16, the opportunity for cross talk from the power supply cable 23 to the transducer's cable 32 is greatly enhanced. Of course, such cross talk poses still another opportunity for the motor drive signal to find its way into the received sonar signal. The signal to noise ratio (SNR) of the return sonar signal is typically low enough that an electrically noisy device, such as the trolling motor 10, can readily cause interference. This interference commonly shows in the display of the sonar control unit 28 as dark black lines or as blanking, obscuring the information that is important to the user.

Trolling motor models are available which include an integral sonar transducer. However, these trolling motors and the integral sonar transducer only operate with a specific control unit which is properly configured for such operation. These systems are designed such that electrical noise that is created by the drive circuitry for the trolling motor 10 may be subtracted out of the sonar signal by the receiver circuitry within the sonar control unit 28, which is specifically designed for that purpose. The circuitry incorporated into the vast majority of trolling motors that are currently available does not allow for this sort of solution. Adding further complication, many sonar transducers utilize a diverse range of driving frequencies for a variety of applications and depending on the manufacturer of the sonar control unit 28. One manufacturer alone may use the following standard sonar transducer frequencies: 83 kHz, 200 kHz, 455 kHz, 800 kHz, with the receiver in the sonar control unit 28 having a sensitivity of ±20 kHz. Compressed high intensity radar pulse (CHIRP) wide-band sonar systems are also available that spread the active frequency and receiver sensitivity to ±70 kHz. With such a wide and overlapping range of sonar transducer frequencies, the opportunity for the trolling motor's pulse width modulator 36 to generate interfering electrical signals is high and presents a problem for the industry. Trolling motor manufacturers do not have the option to specify convenient sonar frequencies, and must instead work with the frequencies utilized and dictated by the manufacturers of the sonar control units 28.

In order to be able to work with numerous brands and types of sonar control units 28, the present trolling motor 10 and control method therefore combine unique circuitry within the motor controller 34, a method for determining the operating frequency of that circuitry, and an additional algorithmic technique for reducing interference generated by the trolling motor 10 to near negligible levels.

Referring again to FIG. 2, the trolling motor 10, and more specifically the motor controller 34, includes a high-side electronic switch 40 between a high-side output 42 of the pulse width modulator 36 and the electric motor 11 and a low-side electronic switch 44 between a low-side output 46 of the pulse width modulator 36 and the electric motor 11. In the present example, the high-side electronic switch 40 is a high-side transistor, and the high-side output 42 is a high-side gate driver output. Similarly, the low-side electronic switch 44 is a low-side transistor, and the low-side output 46 is a low-side gate driver output. In the example shown herein, both the high-side and the low-side transistors are N-channel enhancement-mode power MOSFETs (metal oxide semiconductor field-effect transistors). However, the high-side and low-side electronic switches 40, 44 could be other types of solid state switches such as bipolar transistors, other types of MOSFETs, IGBTs, or the like. The pulse width modulator 36 is designed such that it generates the PWM signal in response to the trolling motor speed command from the user input device 38, as noted herein above. The motor controller 34 thereafter provides current to the electric motor 11 via one of the high-side electronic switch 40 and the low-side electronic switch 44 in response to the PWM signal to control a speed of the electric motor 11. Varying of the duty cycle of the PWM signal varies the speed of the electric motor 11, as is known.

The pulse width modulator 36 is designed such that the PWM signal is synchronous with respect to both the high-side electronic switch 40 and the low-side electronic switch 44. In other words, the same PWM signal will turn on the high-side electronic switch 40 while turning off the low-side electronic switch 44, and vice versa. In the present example, the low-side electronic switch 44 is configured to provide current to the electric motor 11 during an on-time of the PWM signal, and the high-side electronic switch 40 is configured to provide a low-loss path for circulating current during an off-time of the PWM signal. A resistor and a diode are provided in parallel between each of the high-side gate driver output 42 and the high-side electronic switch 40 and the low-side gate driver output 46 and the low-side electronic switch 44, respectively. For example, resistor 48 and diode 50 are provided in parallel in the high-side gate drive leg, while resistor 52 and diode 54 are provided in parallel in the low-side gate drive leg. The resistors 48, 52 slow the pulse width modulated "OFF" to ON" transition of the respective electronic switches 40, 44, which are typically the most noise producing transitions due to ringing. Meanwhile, the diodes 50, 54 allow current to flow easily in the reverse direction but not in the forward direction, thereby providing a fast "OFF" transition time to assist with efficient operation of the circuitry.

The resistors 48, 52, diodes 50, 54, and high- and low-side electronic switches 40, 44 may be provided in the control head 26 of the trolling motor 10. In this instance, the current driving the electric motor 11 is transmitted via the power supply cable 23 in the support column 16. In another example, parts of the motor controller 34, specifically the above-mentioned resistors 48, 52, diodes 50, 54, and high- and low-side electronic switches 40, 44, are provided in the lower unit 14 proximate the electric motor 11. In this latter instance, only the gate drive signals are sent between the control head 26 and the electric motor 11, which dramatically reduces the switched current flowing through the power supply cable 23. The diodes 50, 54 mitigate inefficiencies due to switching transients which would otherwise be present due to the length of the wiring between the control head 26 and the electric motor 11. In still another example, the entire motor controller 34 is located in the lower unit 14, such as described in U.S. Pat. No. 6,902,446, which was incorporated by reference herein above. Note, therefore, that the position of the motor controller 34 as being in the control head 26 as shown in FIG. 1 is for schematic purposes only.

The motor controller 34 also includes a reversing relay 58 for changing the polarity of the power applied to the electric motor 11. A relay driver 60 energizes the reversing relay 58 at the direction of a digital output 62 from the pulse width modulator 36. A current sense resistor 64 and an amplifier 66 are provided for measuring the current flowing through the electric motor 11. The output of the current sense amplifier 66 is directed to analog input 68 such that the pulse width modulator 36 can monitor the current flowing through the electric motor 11. The motor controller 34 also includes a memory 56, one purpose of which will be described herein below. The pulse width modulator 36 is a processor that can accept inputs from the input device 38, the current sense amplifier 66, and the memory 56, and generates outputs to the high-side gate leg at output 42, the low-side gate leg at output 46, and the relay driver 60 at output 62. The pulse width modulator 36 may include its own memory in addition to that provided at 56. The motor controller 34 may include other processors in addition to the pulse width modulator 36.

As noted above, the sonar transducer 30 has an operating frequency, which often is not selectable by the trolling motor manufacturer, but rather by the manufacturer of the sonar control unit 28. Thus, the present system and method provide for an operating frequency of the PWM signal to be selected such that the operating frequency of the sonar transducer 30 is approximately centered between harmonic frequencies of the PWM signal. Such a selection is based on the premise that the generated electrical noise of the trolling motor control circuitry is strongest at the harmonics of the fundamental frequency of the PWM signal. Mathematically, the choices for the operating frequency of the PWM signal can be determined by dividing the sonar frequency by $(n+0.5)$, where n is a positive integer harmonic. In order that the operating frequency of the PWM signal work with various types and models of sonar transducers and sonar control units, the operating frequency of the PWM signal can be selected such that multiple operating frequencies of the sonar transducer are approximately centered between harmonic frequencies of the PWM signal. For example, for each sonar frequency of interest, iterating n provides a table of potential PWM operating frequencies.

Figure 3:
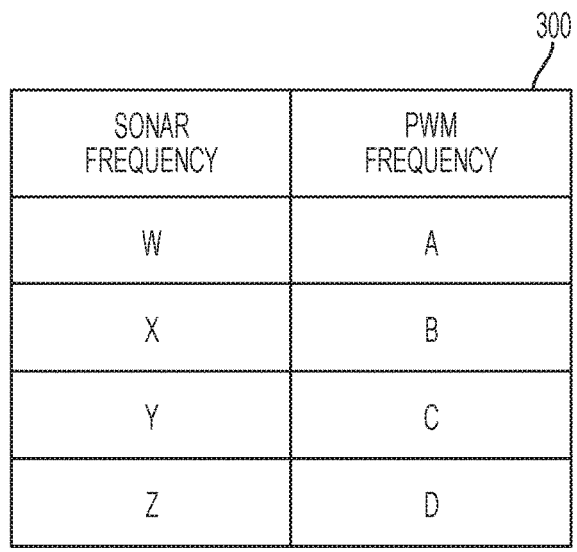
FIG. 3 illustrates an example of an input-output table for use by the motor controller.

In one example, the manufacturer of the motor controller 34 can select the appropriate PWM operating frequency based on a number of known sonar frequencies of sonar transducers and sonar control units commonly used with or configured to work best with that manufacturer's trolling motor 10. In another example, the user of the motor controller 34 can select the PWM operating frequency. For example, there may be a memory 56 in the motor controller 34 that stores an input-output map relating a plurality of sonar transducer operating frequencies to a plurality of predetermined PWM operating frequency options. One example of such an input-output map is shown in FIG. 3, wherein the input-output map is in the form of a table 300. The left-hand column of the table 300 contains known sonar operating frequencies W, X, Y, and Z, which should be understood to represent frequencies in kHz. These sonar operating frequencies are related to PWM operating frequencies A, B, C, and D, respectively, in the right hand column of table 300. Each stored sonar operating frequency is centered between harmonics of the PWM operating frequency with which it is correlated.

Figure 4:
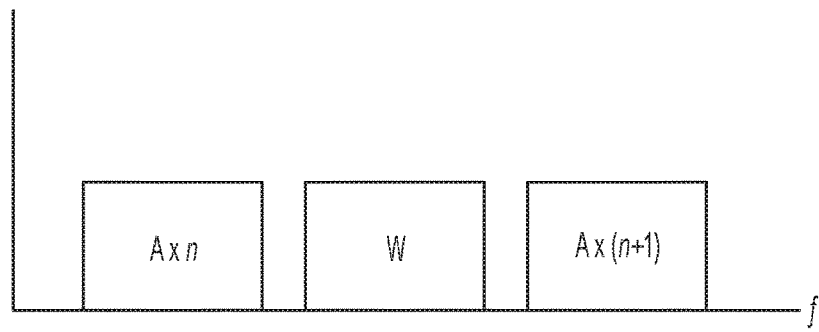
FIG. 4 illustrates an exemplary sonar transducer operating frequency centered between harmonics of a pulse width modulator operating frequency.

For example, referring to FIG. 4, the sonar operating frequency of W is used to further describe this concept. The sonar operating frequency W is shown as being between two harmonics of the PWM operating frequency A, which was obtained from table 300. More specifically, the sonar operating frequency W is between the $n^{th}$ harmonic of A and the $(n+1)^{th}$ harmonic of A. By way of more specific example, if the sonar transducer 30 and sonar control unit 28 operate at a frequency of 455 kHz, the table 300 may correlate this to a PWM operating frequency of 23.3 kHz. The $19^{th}$ harmonic of 23.3 kHz is 442.7 kHz, and the $20^{th}$ harmonic is 466 kHz. The sonar frequency of 455 kHz is approximately centered between 442.7 kHz and 466 kHz. (Note that these values are not spaced exactly equally apart, but $455 \div (n+0.5)$, where n=19, is rounded to 23.3 for purposes of simplicity in producing and storing values in the table 300.) Note that other PWM operating frequencies could be used, but their frequency will affect the type and thus cost of hardware used in the motor controller 34, as will be described further herein below.

In one example, the user can input the sonar operating frequency into the motor controller 34 such as via the input device 38, which may in this instance be a remote control or a switch. The user can move a switch to be adjacent a sonar operating frequency printed on the input device 38 or can press a button on a keypad, which button displays a sonar operating frequency. In other examples, the user can type in the digits of the sonar operating frequency to enter its value into the motor controller 34. The motor controller 34 may thereafter determine the operating frequency of the PWM signal from the input-output map (e.g., table 300) based on the operating frequency of the sonar transducer 30. If the exact sonar operating frequency entered is not included in the table 300, the motor controller 34 can select the PWM operating frequency associated with the closest sonar operating frequency that is in the table 300.

Alternatively, the motor controller 34 can be programmed to sense the operating frequency of the sonar transducer 30 itself and thereafter to select the operating frequency of the PWM signal given the detected sonar operating frequency. For example, if the sonar control unit 28 or the sonar transducer 30 is in signal communication with the motor controller 34 (see FIG. 2), the motor controller 34 can be programmed to read the frequency at which the sonar transducer 30 is operating. The motor controller 34 can then use the table 300 (FIG. 3) stored in the memory 56 to determine the PWM operating frequency designed to provide the least interference.

Figure 5:
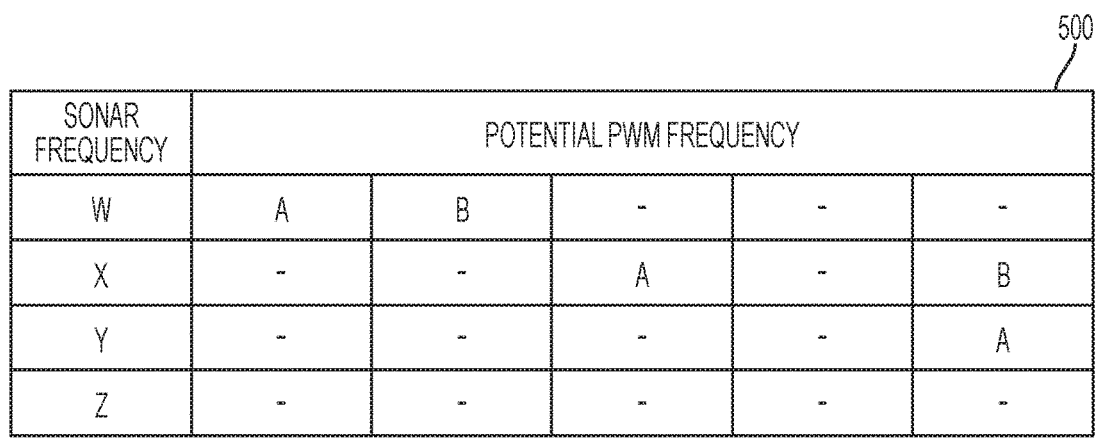
FIG. 5 illustrates another example of an input-output table for use by the motor controller.

FIG. 5 shows an alternative table 500 that can be used when the sonar control unit 28 and thus the sonar transducer 30 operates at multiple frequencies, such as but not limited to when the sonar control unit 28 uses CHIRP. The motor controller 34 can sense the different operating frequencies at which the sonar transducer 30 operates. The motor controller 34 then input these sonar operating frequencies into the table 500 stored in the memory 56 to determine a PWM operating frequency. The motor controller 34 will select the PWM operating frequency that does not interfere with as many of the sonar operating frequencies as possible. For example, if the sonar operating frequencies are W, X, and Y, the motor controller 34 may select to use the PWM operating frequency of A, the nominal and harmonics of which do not interfere with any of W, X, or Y. (As with the table 300, the potential PWM operating frequencies in table 500 are determined by dividing the sonar frequency W, X, Y, or Z in a given row by $(n+0.5)$, where n is a positive integer harmonic. For example, the first column shows the results for n=1; the second column shows the results for n=2; and so on.) If the sonar transducer 30 operates at frequencies W and X only, the motor controller 34 may choose to use a PWM operating frequency of B, the nominal and harmonics of which do not interfere with either of W or X. Of course, it may not be that all the sonar operating frequencies used by the sonar transducer 30 are associated with a choice of the exact same value for a potential PWM operating frequency. The motor controller 34 may in that instance select a PWM operating frequency that is an average or a mode of a number of potential PWM operating frequencies that are all within a given range of one another and are also associated with the greatest number of sonar operating frequencies used by the sonar transducer 30. Returning to the example in which sonar operating frequencies W, X, and Y are detected, if the sonar operating frequency Z is also detected as being used by the sonar transducer 30, and a potential PWM operating frequency stored in the table 500 is A±100 Hz, the motor controller 34 may choose to use A as the PWM operating frequency.

As noted herein above, more than one potential PWM operating frequency can be associated with a single sonar operating frequency. For example, as shown in table 500, multiple potential PWM operating frequencies are associated with each of the sonar operating frequencies in a given row. The parameters of the specific circuitry components used in the motor controller 34 can be used to determine the upper frequency limit, beyond which the PWM signal will create excessive noise. In one instance, a high enough frequency can be chosen such that the harmonic peaks of the PWM operating frequency reside completely outside the sensitivity window of the sonar operating frequencies of interest. Using a higher frequency PWM operating signal that meets these criteria imposes a need to use more electrically quiet motor circuitry components. Less expensive motor circuitry components, which have a lower noise threshold, can be used if a lower PWM operating frequency is selected, which selected PWM operating frequency has a nominal and harmonics which are, as noted above, centered on the operating frequency of the sonar transducer 30. The high efficiency provided by the diodes 50, 54 and the noise reduction provided by the resistors 48, 52 are used to mitigate the fact that there are more harmonics of a lower frequency PWM operating signal that are in-band with the sonar operating frequency than there are for a higher frequency PWM operating signal.

In addition to choosing an appropriate center PWM operating frequency, whether this is done by the manufacturer, the user, or the motor controller 34, the addition of a spreading algorithm mitigates nearly all interference generated by the trolling motor 10. According to the present disclosure, the pulse width modulator 36 utilizes a spread spectrum switching algorithm to reduce a peak noise level of the PWM signal. The spread spectrum algorithm adds cycle-by-cycle jitter to the center PWM frequency, which acts to spread the energy of the harmonics across a wider area. This effectively reduces the peak noise level to the point where there is no longer enough energy to produce interference that shows up on the display of the sonar control unit 28. In one example, the pulse width modulator 36 utilizes the spread spectrum switching algorithm on a cycle-by-cycle basis, or as close to a cycle-by-cycle basis as possible. If a single frequency remains active for too long, the effectiveness of the spread spectrum signal is minimized.

Figure 6:
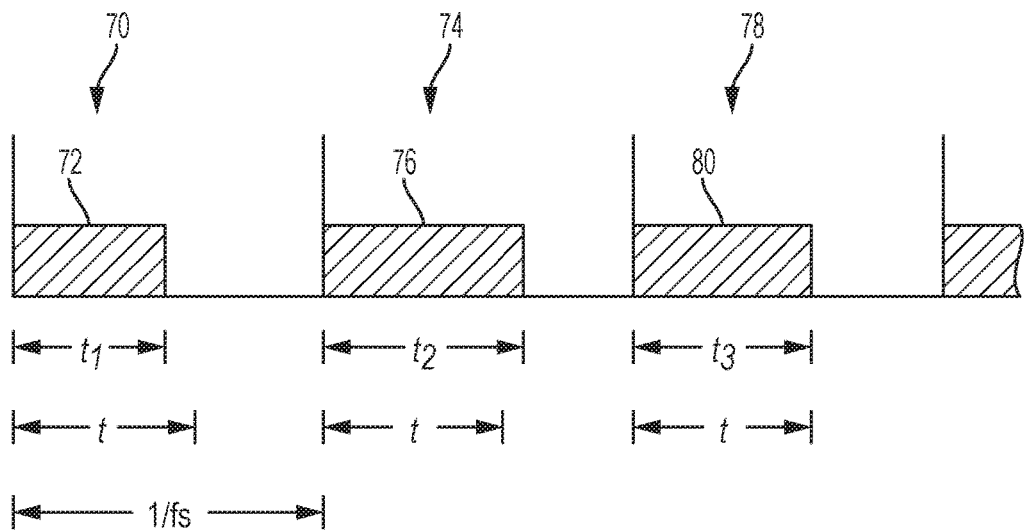
FIG. 6 schematically illustrates a spread spectrum switching algorithm.

For example, the pulse width modulator may include a counter, a clock, and a varying number generator that together produce a PWM signal having a duty cycle that varies, but has an average that corresponds to the desired motor speed. For example, as shown in FIG. 6, the first cycle 70 has a duration 1/fs (where "fs" is the switching frequency), but has a pulse 72 with a pulse duration of $t_1$ (which is less than the pulse period "t"). As a result, the duty cycle of the first cycle 70 is $(t_1)(fs)$. The second cycle 74, however, has the same duration 1/fs, but has a pulse 76 with a pulse duration of $t_2$, which is greater than t. Accordingly, the duty cycle of second cycle 74, $(t_2)(fs)$, is greater than the duty cycle $(t_1)(fs)$ of the first cycle 70. The third cycle 78, moreover, has a pulse 80 with a pulse duration $t_3$, which is approximately equal to t. Accordingly, the duty cycle of the third cycle 78, $(t_3)(fs)$, is greater than the duty cycle of the first cycle 70 but less than the duty cycle of the second cycle 74. However, the various duty cycles of the PWM signal have an average, over a substantial plurality of duty cycles, that corresponds to a desired motor speed. Thus, for example, if the desired motor speed corresponds to a constant duty cycle (t)(fs), then the PWM signal shown in FIG. 6 should have duty cycles such that $[(t_1)(fs)+(t_2)(fs)+(t_3)(fs)+\ldots+(t_N)(fs)]/N=(t)(fs)$. In order to achieve the desired average duty cycle, the PWM signal may be generated such that the on-time or pulse period of each cycle is equal to a base on-time and a random or pseudorandom on-time adjustment. It should be noted that many other spread spectrum switching techniques could be used to accomplish noise reduction, and the above algorithm is merely one example of such a technique.

Figure 7:
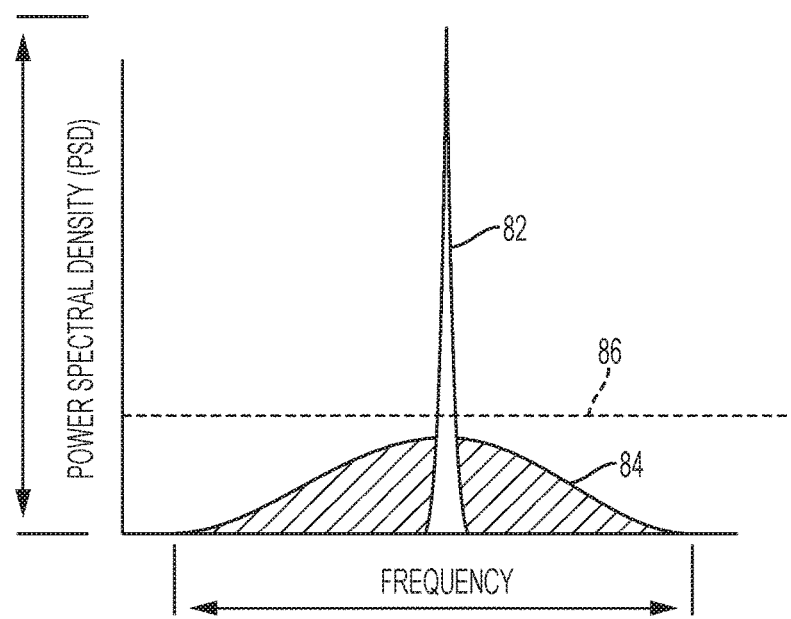
FIG. 7 illustrates the effects of the spread spectrum switching algorithm on the power spectral density of the noise produced by the motor controller's hardware.

The variation of the duty cycles as described in connection with FIG. 6 spreads the frequency distribution of the noise generated by the trolling motor circuitry of FIG. 2. Less expensive hardware does not allow the use of higher PWM frequencies because the hardware is not capable of turning on and off for long enough at very low or very high duty cycles to effect change in the motor speed. If lower frequencies are used, the hardware is functional at low and high duty cycles. However, using lower PWM frequencies with less expensive hardware generates noise due to the above-mentioned fact that lower PWM frequencies have more harmonics that are in-band with the sonar operating frequency. The spread spectrum algorithm can be used to reduce the noise level of the hardware in the trolling motor controller 34. For example, referring to FIG. 7, if the control circuitry in the motor controller 34 would normally produce a waveform as shown at 82, the spread spectrum switching algorithm can be used to spread the frequencies out over a wider area, as shown by waveform 84. This allows the overall noise (measured in terms of power spectral density) to be brought below a noise threshold 86 of the trolling motor's control circuitry.

Figure 8:
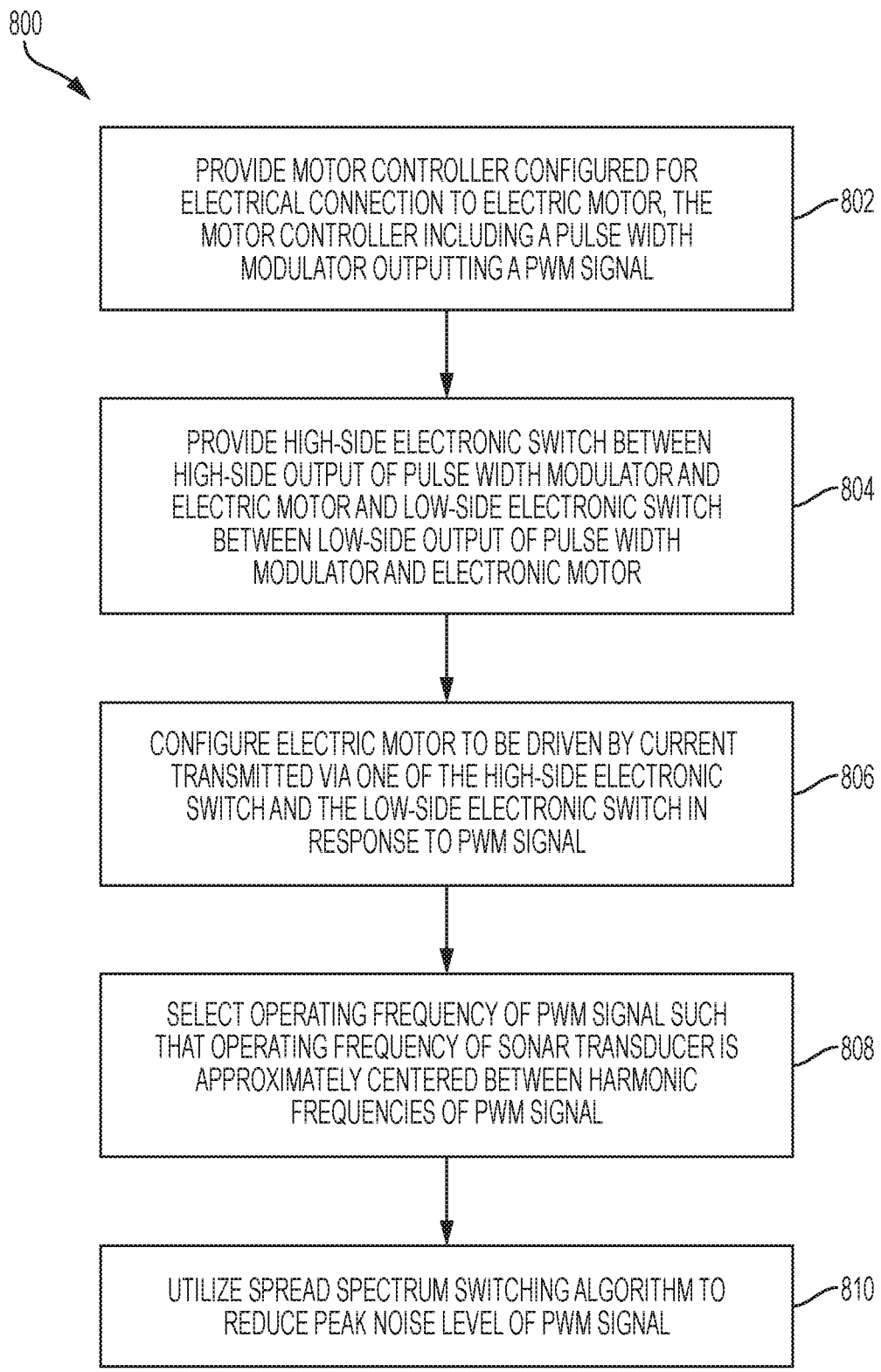
FIG. 8 shows a method for controlling a trolling motor including a sonar transducer and an electric motor configured to rotate a propeller of the trolling motor.

FIG. 8 illustrates a method 800 for controlling a trolling motor 10 including a sonar transducer 30 and an electric motor 11 configured to rotate a propeller 12 of the trolling motor 10. As shown at 802, the method includes providing a motor controller 34 configured for electrical connection to the electric motor 11, wherein the motor controller 34 includes a pulse width modulator 36 outputting a pulse width modulated (PWM) signal. As shown at 804, the method includes providing a high-side electronic switch 40 between a high-side output 42 of the pulse width modulator 36 and the electric motor 11 and a low-side electronic switch 44 between a low-side output 46 of the pulse width modulator 36 and the electric motor 11. As shown at 806, the method includes configuring the electric motor 11 to be driven by current transmitted via one of the high-side electronic switch 40 and the low-side electronic switch 44 in response to the PWM signal. The method also includes selecting an operating frequency of the PWM signal such that an operating frequency of the sonar transducer 30 is approximately centered between harmonic frequencies of the PWM signal, as shown at 808. Additionally, as shown at 810, the method includes utilizing a spread spectrum switching algorithm to reduce a peak noise level of the PWM signal. As described with respect to FIG. 6, the method may include utilizing the spread spectrum switching algorithm on a cycle-by-cycle basis.

According to further examples of the method 800, and as described herein above, the method may also include providing a resistor 48, 52 between each of the high-side output 42 and the high-side electronic switch 40 and the low-side output 46 and the low-side electronic switch 44, respectively. A diode 50, 54 may be provided in parallel with each resistor 48, 52 between each of the high-side output 42 and the high-side electronic switch 40 and the low-side output 46 and the low-side electronic switch 44, respectively. In one example, the high-side output 42 is a high-side gate driver and the high-side electronic switch 40 is a high-side transistor, and the low-side output 46 is a low-side gate driver and the low-side electronic switch 44 is a low-side transistor. The PWM signal may be synchronous with respect to both the high-side transistor and the low-side transistor, and the low-side transistor may be configured to provide current to the electric motor 11 during an on-time of the PWM signal, and the high-side transistor may be configured to provide a low-loss path for circulating current during an off-time of the PWM signal. In one example, both the high-side and the low-side transistors are N-channel enhancement-mode power MOSFETs.

The method 800 may further include providing for selection of the operating frequency of the PWM signal from a plurality of predetermined PWM operating frequency options, such as described herein above with respect to FIGS. 3 and 5. More specifically, the method may include storing an input-output map 300, 500 in a memory 56 of the motor controller 34, the input-output map 300, 500 relating a plurality of sonar transducer operating frequencies to the plurality of predetermined PWM operating frequency options. The operating frequency of the PWM signal may be selected from the input-output map based on the operating frequency of the sonar transducer 30. According to the present disclosure, the method may include selecting the operating frequency of the PWM signal such that multiple operating frequencies of the sonar transducer are approximately centered between harmonic frequencies of the PWM signal.

In the above description, certain terms have been used for brevity, clarity, and understanding. No unnecessary limitations are to be inferred therefrom beyond the requirement of the prior art because such terms are used for descriptive purposes and are intended to be broadly construed. The different systems described herein may be used alone or in combination with other systems. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for controlling a trolling motor including a sonar transducer and an electric motor configured to rotate a propeller of the trolling motor, the method comprising:
    providing a motor controller configured for electrical connection to the electric motor, wherein the motor controller includes a pulse width modulator outputting a pulse width modulated (PWM) signal;
    providing a high-side electronic switch between a high-side output of the pulse width modulator and the electric motor and a low-side electronic switch between a low-side output of the pulse width modulator and the electric motor;
    configuring the electric motor to be driven by current transmitted via one of the high-side electronic switch and the low-side electronic switch in response to the PWM signal;
    selecting an operating frequency of the PWM signal such that an operating frequency of the sonar transducer is approximately centered between harmonic frequencies of the PWM signal; and
    utilizing a spread spectrum switching algorithm to reduce a peak noise level of the PWM signal.

2. The method of claim 1, further comprising providing a resistor between each of the high-side output and the high-side electronic switch and the low-side output and the low-side electronic switch, respectively.

3. The method of claim 2, further comprising providing a diode in parallel with each resistor between each of the high-side output and the high-side electronic switch and the low-side output and the low-side electronic switch, respectively.

4. The method of claim 3, wherein the high-side output is a high-side gate driver and the high-side electronic switch is a high-side transistor, and the low-side output is a low-side gate driver and the low-side electronic switch is a low-side transistor.

5. The method of claim 4, wherein the PWM signal is synchronous with respect to both the high-side transistor and the low-side transistor.

6. The method of claim 5, wherein the low-side transistor is configured to provide current to the electric motor during an on-time of the PWM signal, and the high-side transistor is configured to provide a low-loss path for circulating current during an off-time of the PWM signal.

7. The method of claim 4, wherein both the high-side and the low-side transistors are N-channel enhancement-mode power MOSFETs.

8. The method of claim 1, further comprising providing for selection of the operating frequency of the PWM signal from a plurality of predetermined PWM operating frequency options.

9. The method of claim 8, further comprising:
    storing an input-output map in a memory of the motor controller, the input-output map relating a plurality of sonar transducer operating frequencies to the plurality of predetermined PWM operating frequency options; and
    wherein the operating frequency of the PWM signal is selected from the input-output map based on the operating frequency of the sonar transducer.

10. The method of claim 1, further comprising selecting the operating frequency of the PWM signal such that multiple operating frequencies of the sonar transducer are approximately centered between the harmonic frequencies of the PWM signal.

11. The method of claim 1, further comprising utilizing the spread spectrum switching algorithm on a cycle-by-cycle basis.

12. A trolling motor comprising:
    an electric motor coupled to and configured to rotate a propeller;
    a motor controller electrically connected to the electric motor, the motor controller including a pulse width modulator generating a pulse width modulated (PWM) signal;
    a high-side transistor between a high-side gate driver output of the pulse width modulator and the electric motor and a low-side transistor between a low-side gate driver output of the pulse width modulator and the electric motor;
    a resistor and a diode in parallel between each of the high-side gate driver output and the high-side transistor and the low-side gate driver output and the low-side transistor, respectively; and
    a user input device in signal communication with the motor controller and configured to input a trolling motor speed command to the pulse width modulator;
    wherein the pulse width modulator generates the PWM signal in response to the trolling motor speed command, and the motor controller provides current to the electric motor via one of the high-side transistor and the low-side transistor in response to the PWM signal to control a speed of the electric motor.

13. The trolling motor of claim 12, wherein the PWM signal is synchronous with respect to both the high-side transistor and the low-side transistor.

14. The trolling motor of claim 13, wherein the low-side transistor is configured to provide current to the electric motor during an on-time of the PWM signal, and the high-side transistor is configured to provide a low-loss path for circulating current during an off-time of the PWM signal.

15. The trolling motor of claim 14, wherein both the high-side and the low-side transistors are N-channel enhancement-mode power MOSFETs.

16. The trolling motor of claim 12, further comprising a sonar transducer coupled to a lower unit of the trolling motor that holds the propeller, the sonar transducer having an operating frequency;
wherein an operating frequency of the PWM signal is selected such that the operating frequency of the sonar transducer is approximately centered between harmonic frequencies of the PWM signal.

17. The trolling motor of claim 16, wherein the operating frequency of the PWM signal is selected such that multiple operating frequencies of the sonar transducer are approximately centered between the harmonic frequencies of the PWM signal.

18. The trolling motor of claim 16, further comprising:
a memory in the motor controller that stores an input-output map relating a plurality of sonar transducer operating frequencies to a plurality of predetermined PWM operating frequency options;
wherein the motor controller determines the operating frequency of the PWM signal from the input-output map based on the operating frequency of the sonar transducer.

19. The trolling motor of claim 12, wherein the pulse width modulator utilizes a spread spectrum switching algorithm to reduce a peak noise level of the PWM signal.

20. The trolling motor of claim 19, wherein the pulse width modulator utilizes the spread spectrum switching algorithm on a cycle-by-cycle basis.

* * * * *